United States Patent [19]
Koyama et al.

[11] Patent Number: 5,640,632
[45] Date of Patent: Jun. 17, 1997

[54] VIEWFINDER DEVICE

[75] Inventors: Takeshi Koyama; Shouichi Yamazaki, both of Kanagawa-ken, Japan

[73] Assignee: Canon Kabushiki Kaisha, Tokyo, Japan

[21] Appl. No.: 413,931

[22] Filed: Mar. 30, 1995

Related U.S. Application Data

[63] Continuation of Ser. No. 112,316, Aug. 27, 1993, abandoned.

[30] Foreign Application Priority Data

Sep. 11, 1992 [JP] Japan ................................ 4-269711
Nov. 30, 1992 [JP] Japan ................................ 4-345552

[51] Int. Cl.$^6$ ........................................ G03B 13/08
[52] U.S. Cl. ........................................ 396/382; 396/386
[58] Field of Search ........................ 354/155, 166, 354/199, 219, 222; 396/382, 386

[56] References Cited

U.S. PATENT DOCUMENTS 3,286,592 11/1966 Wagner et al. .
4,708,444 11/1987 Tsuji .
5,091,739 2/1992 Kawamura ............................ 354/219
5,095,326 3/1992 Nozaki et al. ........................ 354/222
5,241,337 8/1993 Betensky et al. .
5,253,005 10/1993 Koyama et al. ...................... 354/152
5,323,264 6/1994 Kato .

FOREIGN PATENT DOCUMENTS 61-156018 7/1986 Japan .

Primary Examiner—David M. Gray
Attorney, Agent, or Firm—Fitzpatrick, Cella, Harper & Scinto

[57] ABSTRACT

A viewfinder device includes a first prism unit and a second prism unit. The first prism unit includes an incident/reflecting surface 1-1 for receiving and allowing light from the objective lens to enter the first prism unit, a surface 1-2 for reflecting the light entering from the surface 1-1, and a surface 1-3 for reflecting the light reflected by the surface 1-2. The second prism unit includes an incident/reflecting surface 2-1 for receiving and allowing the light reflected by the surface 1-3 to enter the second prism, a surface 2-2 for reflecting the light entering the surface 2-1, and a surface 2-3 for reflecting the light reflected by the surface 2-2. The surface 2-1 reflects the light reflected by the surface 2-3, and the objective lens forms an image between the first prism unit and the second prism unit.

30 Claims, 7 Drawing Sheets

VIEWFINDER DEVICE

This application is a continuation of application Ser. No. 08/112,316 filed Aug. 27, 1993, now abandoned.

BACKGROUND OF THE INVENTION

1. Field of the Invention

The present invention relates to a real image type viewfinder system and, more particularly, to a real image type viewfinder system which includes an optical system having the whole size reduced by using an appropriately set prism and which is arranged in such a manner that a viewfinder image (object image) which is formed as an inverted real image by an objective lens is observed as a non-inverted erecting image by means of the appropriately set prism.

2. Description of the Related Art

In the field of viewfinder systems for photographic cameras, video cameras, or the like, various real image type viewfinder systems have heretofore been proposed which are generally arranged in such a manner that a viewfinder image is observed as a real image.

Such a real image type viewfinder system has recently been widely used in cameras of the type having a zoom lens. This is because it is possible to easily reduce the size of the entire optical system of the real image type viewfinder system as compared to a virtual image type viewfinder.

FIG. 5 is a schematic perspective view showing the essential portions of a conventional real image type viewfinder system which uses a Porro prism for providing a non-inverted erecting image.

The viewfinder system shown in FIG. 5 includes an objective lens 101 having a negative lens 102a and a positive lens 102b each of which is arranged to move along the optical axis of the objective lens 101 in accordance with the zooming of a photographic lens (not shown), a field lens 103, a Porro prism 104 for inverting an inverted viewfinder image formed by the objective lens 101 to provide a non-inverted erected image, and an eyepiece lens 105.

The negative lens 102a and the positive lens 102b which constitute the objective lens 101 perform zooming by moving along the optical axis of the objective lens 101 in accordance with the zooming of the photographic lens, as indicated by the arrows shown adjacent to the respective lenses 102a and 102b. Thus, the observing magnification of the viewfinder image is made to vary in correspondence with a photographing magnification which varies in accordance with the zooming of the photographic lens.

The viewfinder image which is formed as an inverted real image by the objective lens 101 is formed in the vicinity of the field lens 103. The inverted real image is reflected by reflection surfaces 104a, 104b, 104c and 104d of the Porro prism 104, in that order, whereby the viewfinder image is inverted from the inverted real image to a non-inverted erect image. The viewfinder image which is provided as the non-inverted erect image is observed through the eyepiece lens 105.

In the case of the above-described real image type viewfinder system which uses the Porro prism 104 for providing the non-inverted erecting image, the Porro prism 104 has an external shape which partially projects in the horizontal and vertical directions as shown in FIG. 6, with the result that the size of the entire viewfinder system increases.

As is known in the art, it is preferable to dispose the objective lens 104 of the viewfinder system in the vicinity of the photographic lens because parallax can be reduced.

It is also desired to dispose the eyepiece lens 105 in a position such that the nose of a photographer does not come into contact with a camera when the photographer looks into the viewfinder thereof. Accordingly, in the design of an ordinary form of camera, it is necessary to arrange the eyepiece lens 105 in such a manner as to project from the camera body in the rearward direction thereof, or to dispose the eyepiece lens 105 in an end portion of the camera body.

However, the former system has the disadvantage that the portability of the camera is impaired, while the latter system has the disadvantage that it is necessary to space the optical axis of the objective lens 101 apart from that of the eyepiece lens 105 in parallax terms.

In other words, it is necessary to design the viewfinder system in such a manner as to reduce the length of the entire objective lens and the vertical size of the viewfinder system and to space the optical axis of the objective lens 101 and that of the eyepiece lens 101 apart from each other to some extent in the horizontal direction. As a result, the complexity of the entire optical system tends to increase.

As another real image type viewfinder system, a secondary image forming type viewfinder system is known. This type of viewfinder system has, however, the problem that the length of the entire objective lens increases and the size of the entire optical system increases.

Japanese Laid-Open Patent Application No. Sho 61-156018 proposes a real image type zoom viewfinder utilizing the secondary image forming type viewfinder system. The proposed real image type viewfinder includes an objective lens made up of a multiplicity of lens units in such a manner as to perform zooming by causing a predetermined lens unit of the multiplicity of lens units to move along the optical axis of the viewfinder, and a Porro prism is disposed rearward of the objective lens as image inverting means to provide an non-inverted erect image.

In the real image type zoom viewfinder which is suitably used as a viewfinder system in a viewfinder device, if a reflecting member, such as the Porro prism, is used as the image inverting means, it is preferable to utilize total reflection in terms of reflecting efficiency since no evaporated substance (aluminum or silver) is needed.

However, in the system utilizing total reflection, a bundle of rays which does not satisfy a total-reflection condition may pass through the reflection surfaces of the reflecting member and part of the passing bundle of rays may reach an eyepiece lens as stray light to form a ghost or a flare.

FIGS. 14(A) and 14(B) show the state in which the bundle of rays does not satisfy the total-reflection condition, and schematically show the states of the lens arrangement of a real image type viewfinder system in the case of wide-angle-end setting and in the case of telephoto-end setting, respectively. In both figures, a Porro prism is shown in expanded form.

The real image type viewfinder system shown in FIGS. 14(A) and 14(B) includes a first lens unit 91 of negative refractive power and a second lens unit 92 of positive refractive power, and the first lens unit 91 and the second lens unit 92 constitute an objective lens 100. The real image type viewfinder system shown in FIGS. 14(A) and 14(B) also includes a stop 99 fixed to the first lens unit 91, a stop 90 fixed to the second lens unit 92, prism blocks 96 and 97, shown in expanded form, each of which has reflection surfaces as image inverting means, a field-of-view frame 98 disposed in the vicinity of the image forming plane of the objective lens 100 for limiting the field of view of the viewfinder system, and an eyepiece lens 95.

The real image type viewfinder system shown in FIGS. 14(A) and 14(B) performs zooming by causing the first and second lens units 91 and 92 of the objective lens 100 to move along the optical axis thereof together with the stops 99 and 90 as indicated by the arrows shown adjacent to the respective lens units 91 and 92. A viewfinder image formed in the vicinity of the field-of-view frame 98 by the objective lens 100 is conducted to the eyepiece lens 95 via the prism blocks 96 and 97 which serve as image inverting means, so that the viewfinder image is observed through the eyepiece lens 95.

In the above-described zooming operation, it is to be noted that the bundle width of an on-axial bundle of rays for the wide-angle-end setting shown in FIG. 14(A) is greater than that of the on-axial bundle of rays for the telephoto-end setting shown in FIG. 14(B). Accordingly, in the case of the wide-angle end setting, part of the bundle of rays does not satisfy the total-reflection condition on total-reflection surfaces provided in the prism blocks 96 and 97 and passes through the total-reflection surfaces without being totally reflected, to form stray light. Part of the stray light enters the eyepiece lens 95 and impairs the observation condition of the viewfinder image.

SUMMARY OF THE INVENTION

A first object of the present invention is, therefore, to reduce the size of the entire viewfinder optical system in the vertical and horizontal directions thereof by utilizing a prism having a roof surface which is appropriately set for providing a non-inverted erect image.

A second object of the present invention is to provide a real image type viewfinder system capable of inverting a viewfinder image, which is formed as an inverted real image by an objective lens, from the inverted real image to a non-inverted erect image, thereby realizing observation of a high-quality viewfinder image.

A third object of the present invention is to provide a real image type viewfinder system in which, by utilizing a prism having a roof surface which is appropriately set, the entire size can be reduced in the vertical direction and the optical axis of an objective lens and that of an eyepiece lens can be spaced comparatively far apart from each other without increasing parallax. In this arrangement, the eyepiece lens can be located in an end portion of a camera body.

A fourth object of the present invention is to provide a zoom viewfinder in which, by appropriately setting the lens arrangement of an objective lens, it is possible to easily effect zooming, while the entire lens system can be reduced in size and also in which it is possible to effectively eliminate stray light which passes through the total-reflection surfaces of a prism used as image inverting means and enters an eyepiece lens without satisfying the total-reflection condition, so that a high-quality viewfinder image can be observed with various viewfinder magnifications.

To achieve the above-described objects, according to one aspect of the present invention, there is provided a viewfinder device which comprises a first prism unit and a second prism unit, and the first prism unit includes a surface 1-1 for entering light from the objective lens into the first prism unit, a surface 1-2 for reflecting the light entering from the surface 1-1 and a surface 1-3 for reflecting the light reflected by the surface 1-2, whereas the second prism unit includes a surface 2-1 for entering the light reflected by the surface 1-3, a surface 2-2 for reflecting the light entering from the surface 2-1, and a surface 2-3 for reflecting the light reflected by the surface 2-2. The surface 2-1 reflects the light reflected by the surface 2-3, and the objective lens forms an image between the first prism unit and the second prism unit.

According to another aspect of the present invention, there is provided a zoom viewfinder which comprises an objective lens including a first lens unit of negative refractive power, a movable stop, and a second lens unit of positive refractive power which are arranged in that order from an object side. In the zoom viewfinder, a viewfinder image formed by the objective lens is inverted from an inverted real image to a non-inverted erect image by an image inverting optical system, and the first lens unit, the movable stop and the second lens unit are made to move toward the object side while reducing their respective separations, thereby effecting zooming from a wide-angle end toward a telephoto end. The thus-obtained viewfinder image is subjected to observation through an eyepiece lens.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
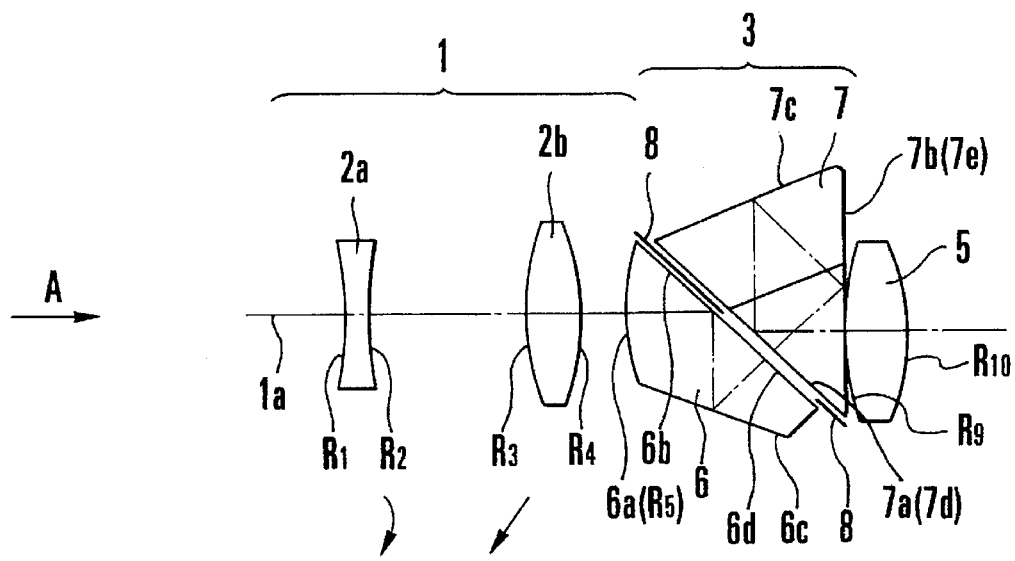
FIG. 1 is a diagrammatic cross-sectional view showing an optical system according to a first embodiment of the present invention.
Figure 2:
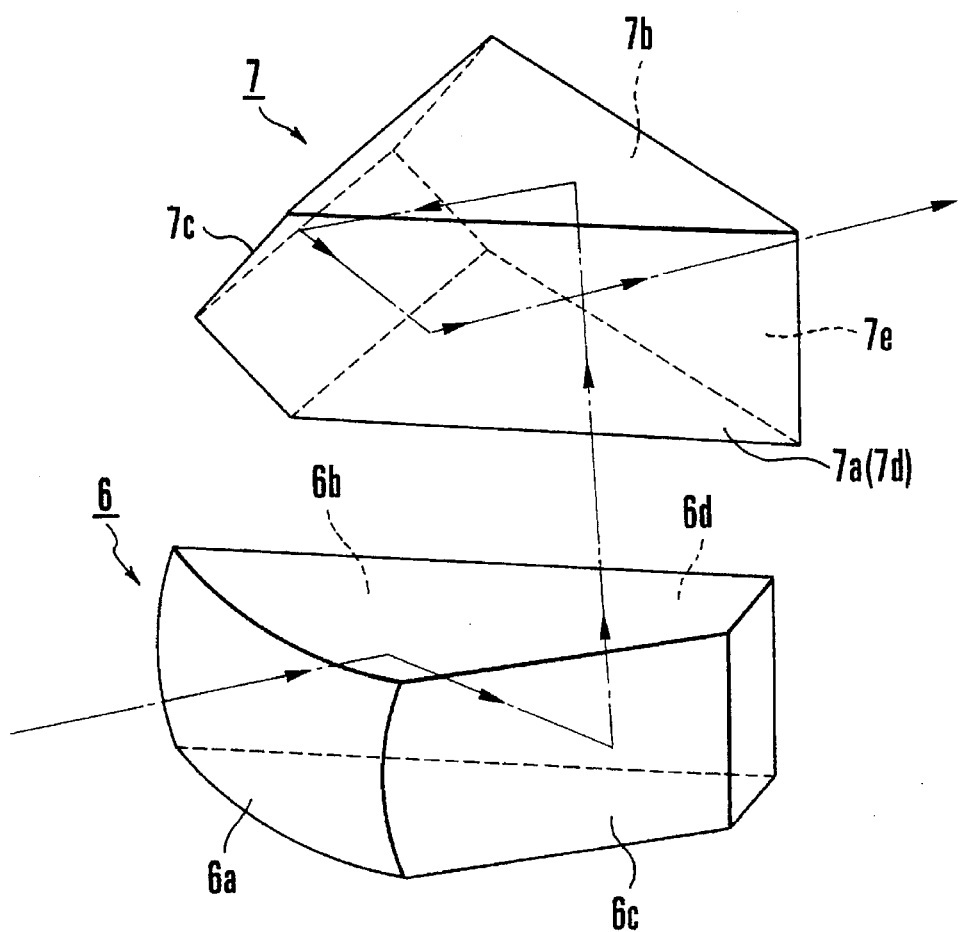
FIG. 2 is a perspective view showing the essential portions of the optical system of FIG. 1.
Figure 3:
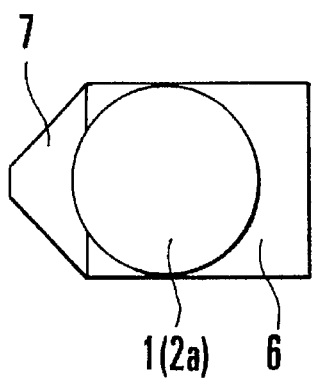
FIG. 3 is a schematic view taken in the direction of an arrow A of FIG. 1.

FIG. 1 is a diagrammatic cross-sectional view showing a viewfinder according to a first embodiment of the present invention. FIG. 2 is a perspective view showing the essential portions of the viewfinder. FIG. 3 is a schematic view taken in the direction of an arrow A of FIG. 1 (i.e., a schematic front elevational view).

In the viewfinder shown in FIGS. 1, 2 and 3, an objective lens 1 has two lenses: a negative lens 2a and a positive lens 2b each of which is movable along an optical axis 1a of the objective lens 1. A prism unit 3 for providing an non-inverted erect image is made up of a first prism 6 and a second prism 7. A field-of-view frame 8 serves to limit the field of view of the viewfinder, and is provided in the narrow space defined between an exit surface 6d of the first prism 6 and an opposing entrance surface 7a of the second prism 7. A viewfinder image which is obtained as an inverted real image from the objective lens 1 is formed in the vicinity of the field-of-view frame 8 via the first prism 6. The viewfinder image which is the inverted real image formed in the vicinity of the field-of-view frame 8 is conducted to an eyepiece lens 5 via the second prism 7 so that the viewfinder image is observed as a non-inverted erect image through the eyepiece lens 5.

In the first embodiment, the negative lens 2a and the positive lens 2b which constitute the objective lens 1 perform zooming by moving along the optical axis 1a of the objective lens 1 in accordance with the zooming of the photographic lens (not shown), as indicated by the arrows shown adjacent to the respective negative and positive lenses 2a and 2b. Thus, the viewfinder image can be observed as an image whose size varies in correspondence with a photographing magnification which varies in accordance with the zooming of the photographic lens.

A bundle of rays conducted from the objective lens 1 is made to enter the first prism 6 from an entrance surface 6a (surface 1-1). The entrance surface 6a is formed by a curved surface which is a convex surface opposed to the objective lens 1 and which has a positive refractive power. The objective lens 1 and the entrance surface 6a are arranged to constitute an exit-side telecentric optical system. The bundle of rays which has entered from the entrance surface 6a is totally reflected from a surface 6b (surface 1-2) toward a surface 6c. The surface 6c (surface 1-3) reflects the bundle of rays incident from the surface 6b to make it perpendicularly incident on a surface (exit surface) 6d (surface 1-4) which is on the same plane as the surface 6b. The bundle of rays is made to exit through the surface 6d.

The bundle of rays conducted from the surface 6d of the first prism 6 is made to enter the second prism 7 from the surface 7a (surface 2-1). The surface 6d and the surface 7a are approximately parallel to each other. The bundle of rays which has entered from the surface 7a is totally reflected by a surface 7b (surface 2-2) which is provided approximately perpendicularly to the optical axis 1a of the objective lens 1. The bundle of rays which has been totally reflected by the surface 7b is made incident on a surface 7c (surface 2-3) which is formed as a roof surface. The surface 7c reflects the bundle of rays conducted from the surface 7b, thereby conducting it to a surface 7d (surface 2-4) which is on the same plane as the surface 7a. The surface 7c makes the bundle of rays incident on the surface 7d at an angle which is selected so that the bundle of rays incident on the surface 7d is totally reflected therefrom in a direction parallel to the optical axis 1a.

The surface 7c which is formed as the roof surface is folded along the shorter sides of an observing field of view (the field of view of the viewfinder), i.e., in the vertical direction of an ordinary camera. The bundle of rays which has been totally reflected by the surface 7d is made perpendicularly incident on a surface 7e which is on the same plane as the surface 7b. The incident bundle of rays is made to exit through the surface 7e.

The viewfinder image (object image) conducted from the objective lens 1 is formed in the vicinity of the exit surface 6d of the first prism 6, i.e., in the vicinity of the field-of-view frame 8. The viewfinder image which is formed as an inverted real image in the vicinity of the field-of-view frame 8 is conducted to the eyepiece lens 5 as a non-inverted erect image via the second prism 7, whereby the viewfinder image can be observed as the non-inverted erecting image through the eyepiece lens 5.

In the first embodiment, individual constituent elements, such as the first and second prisms 6 and 7 and the field-of-view frame 8, are set in the above-described manner, and total reflection is utilized to fold the optical path of the viewfinder. Therefore, as shown in FIG. 3, the respective amounts of vertical and horizontal projections of the entire viewfinder system can be made small compared to the Porro prism viewfinder system shown in FIG. 6. Accordingly, the space of the viewfinder system can be effectively utilized, whereby the size of the entire viewfinder system can be reduced.

Further, in the first embodiment, the objective lens 1 and the entrance surface 6a of the first prism 6 are arranged to constitute the exit-side telecentric optical system, and the condition required for total reflection of a bundle of rays is satisfied even in the case of a half field of view of not less than 20 degrees. Accordingly, it is possible to facilitate observation of a viewfinder image of wide field of view.

Further, in the first embodiment, an object image obtained from the objective lens 1 is formed in the vicinity of the field-of-view frame 8 disposed in the easily sealable space between the first prism 6 and the second prism 7. Accordingly, foreign matter, such as dust, is effectively prevented from adhering to the exit surface 6d, the entrance surface 7a or the like and being observed together with a viewfinder image.

Figure 4:
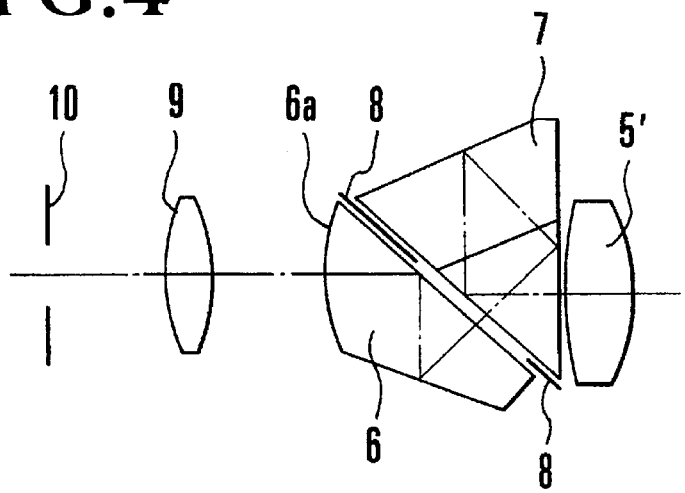
FIG. 4 is a schematic cross-sectional view of the essential portions of an optical system according to a second embodiment of the present invention.
Figure 5:
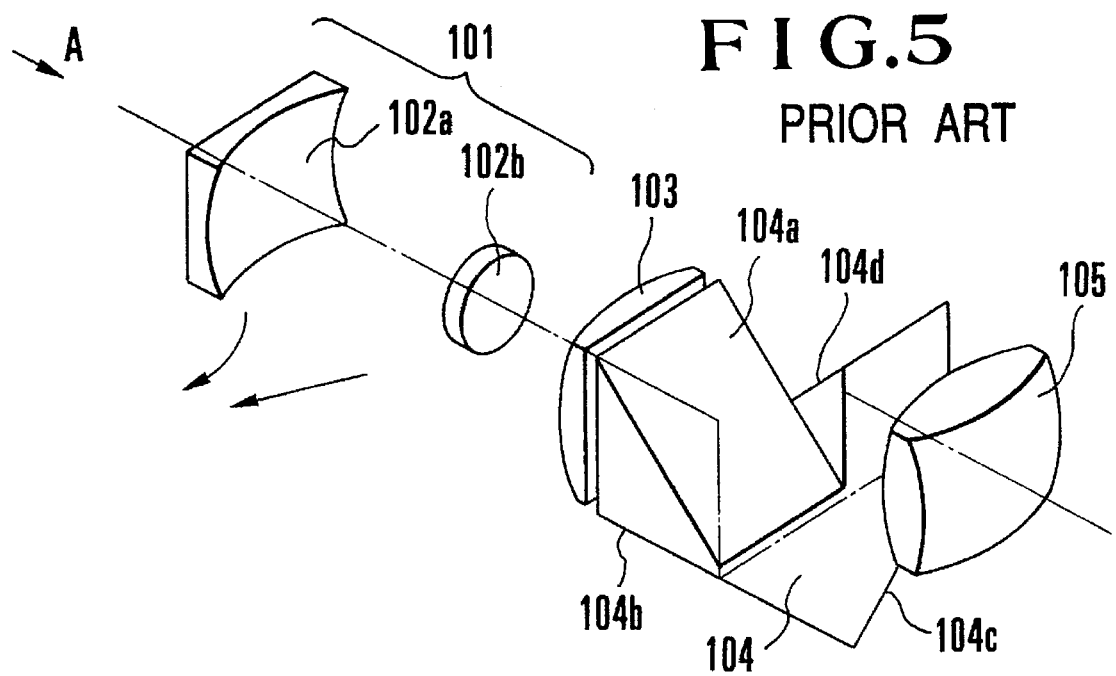
FIG. 5 is a schematic perspective view showing the essential portions of a conventional real image type viewfinder system.

FIG. 4 is a schematic cross-sectional view of the essential portions of a second embodiment of the present invention. In FIG. 4, the same reference numerals are used to denote constituent element substantially identical to those shown in FIG. 1.

The shown real image type viewfinder system according to the second embodiment is of a type which is suitable for use with a photographic lens made from a lens having a single focal length. Accordingly, the objective lens 1 does not have a zooming part and is formed by a single positive lens 9.

The shown arrangement includes a front stop 10, and the positive lens 9 and the front stop 10 as well as entrance surface 6a of the first prism 6 are arranged to constitute an exit-side telecentric optical system. The arrangement of the other portions is substantially identical to that of the corresponding portions of the first embodiment shown in FIG. 1.

Figure 7:
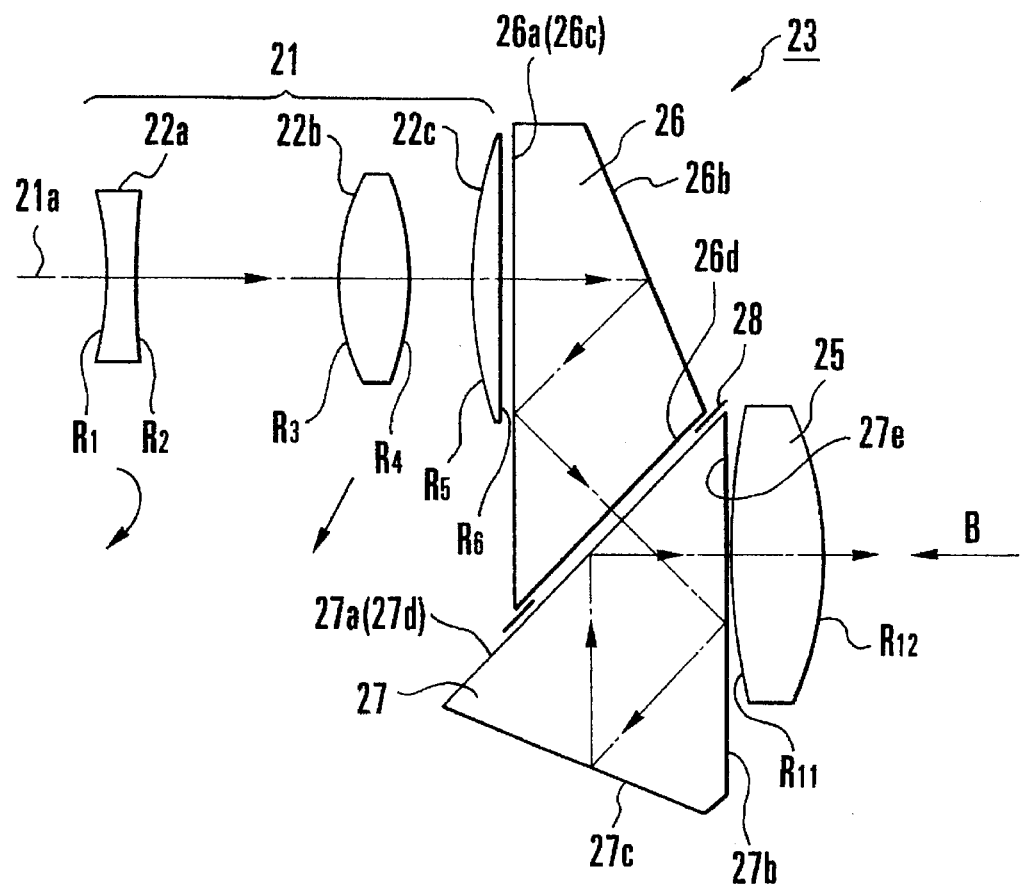
FIG. 7 is a schematic cross-sectional view of the essential portions of an optical system according to a third embodiment of the present invention.
Figure 8:
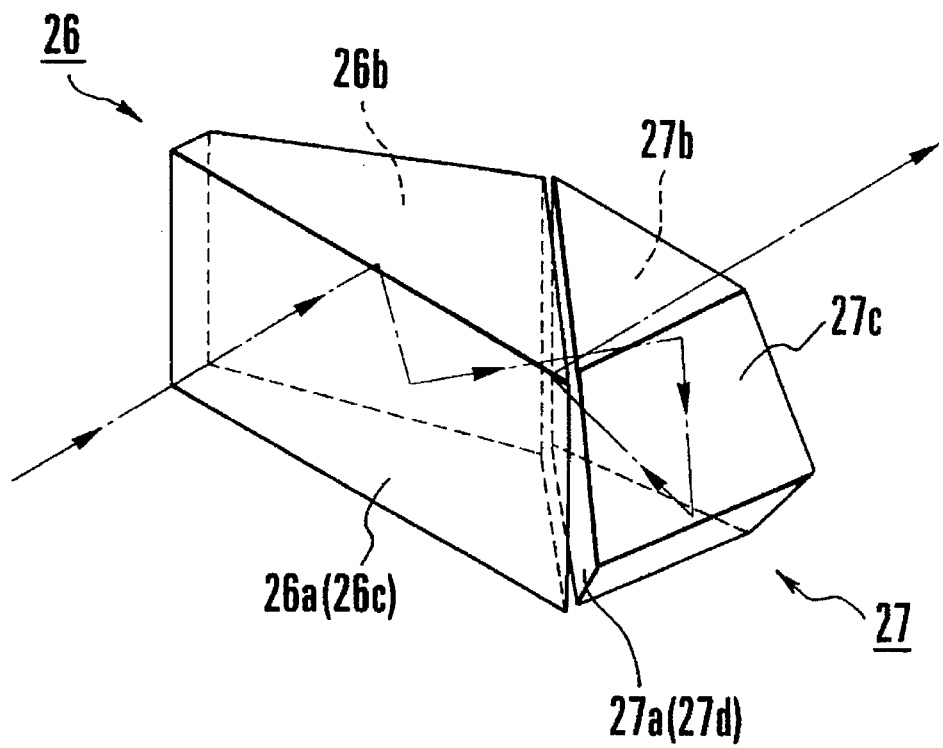
FIG. 8 is a schematic perspective view of the essential portions of the optical system of FIG. 7.
Figure 9:
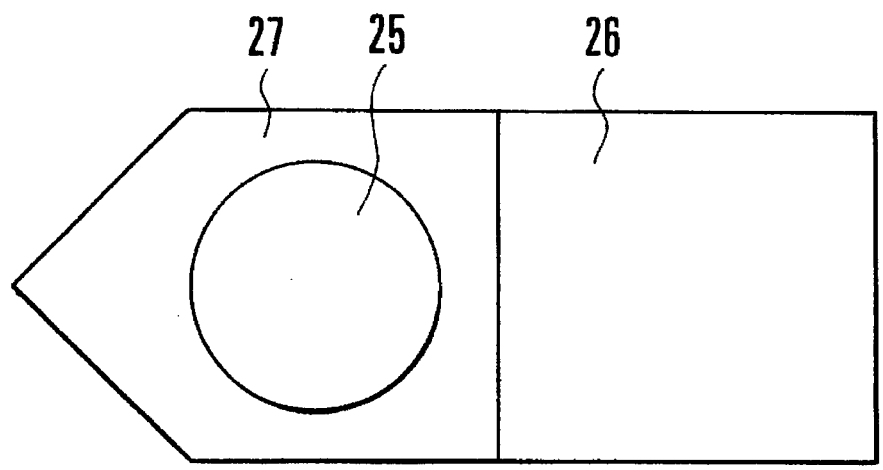
FIG. 9 is a schematic view taken in the direction of an arrow B of FIG. 7.

FIG. 7 is a schematic cross-sectional view of the essential portions of an optical system according to a third embodiment of the present invention. FIG. 8 is a schematic perspective view of the prism unit 23 shown in FIG. 7. FIG. 9 is a schematic view taken in the direction of an arrow B of FIG. 7.

In the optical system shown in FIGS. 7, 8 and 9, an objective lens 21 has three lenses: a negative lens 22a and a positive lens 22b each of which is movable along an optical axis 21a of the objective lens 21, as well as a fixed positive lens 22c. A prism unit 23 for providing an non-inverted erect image is made up of a first prism 26 and a second prism 27. A field-of-view frame 28 serves to limit the field of view of the viewfinder, and is provided in the narrow space defined between an exit surface 26d of the first prism 26 and an opposing entrance surface 27a of the second prism 27.

A viewfinder image which is obtained as an inverted real image from the objective lens 21 is formed in the vicinity of the field-of-view frame 28 via the first prism 26. The viewfinder image which is the inverted real image formed in the vicinity of the field-of-view frame 28 is conducted to an eyepiece lens 25 via the second prism 27 so that the viewfinder image is observed as a non-inverted erect image through the eyepiece lens 25.

In the third embodiment, the negative lens 22a and the positive lens 22b which constitute the objective lens 21 perform zooming by moving along the optical axis 21a of the objective lens 21 independently of each other in accordance with the zooming of a photographic lens (not shown), as indicated by the arrows shown adjacent to the respective negative and positive lenses 22a and 22b. Thus, the viewfinder image can be observed as an image whose size varies in correspondence with a photographing magnification which varies in accordance with the zooming of the photographic lens.

A bundle of rays conducted from the objective lens 21 is made to enter the first prism 26 from an entrance surface 26a (surface 1-1). The objective lens 21 is arranged to constitute an exit-side telecentric optical system. The bundle of rays which has entered through the entrance surface 26a is reflected from a surface 26b (surface 1-2) toward a surface 26c (surface 1-3) which is on the same plane as the entrance surface 26a. The surface 26c (surface 1-3) totally reflects the bundle of rays conducted from the surface 26b to make it perpendicularly incident on a surface (exit surface) 26d (surface 1-4). The bundle of rays is made to exit through the surface 26d.

The bundle of rays conducted from the surface 26d of the first prism 26 is made to enter the second prism 27 from the surface 27a (surface 2-1). The surface 26d and the surface 27a are approximately parallel to each other. The bundle of rays which has entered from the surface 27a is totally reflected by a surface 27b (surface 2-2) which is provided approximately perpendicularly to the optical axis 21a of the objective lens 21. The bundle of rays which has been totally reflected by the surface 27b is made incident on a surface 27c (surface 2-3) which is formed as a roof surface. The surface 27c reflects the bundle of rays conducted from the surface 27b, thereby conducting it to a surface 27d which is on the same plane as the surface 27a. The surface 27c makes the bundle of rays incident on the surface 27d at an angle which is selected so that the bundle of rays incident on the surface 27d is totally reflected therefrom in a direction parallel to the optical axis 21a.

The surface 27c which is formed as the roof surface is folded along the shorter sides of an observing field of view (the field of view of the viewfinder), i.e., in the vertical direction of an ordinary camera. The bundle of rays which has been totally reflected by the surface 27d is made perpendicularly incident on a surface 27e which is on the same plane as the surface 27b. The incident bundle of rays is made to exit through the surface 27e.

The viewfinder image (object image) conducted from the objective lens 21 is formed in the vicinity of the surface 26d of the first prism 26, i.e., in the vicinity of the field-of-view frame 28. The viewfinder image which is formed as an inverted real image in the vicinity of the field-of-view frame 28 is conducted to the eyepiece lens 25 as a non-inverted erect image via the second prism 27, whereby the viewfinder image can be observed as the non-inverted erect image through the eyepiece lens 25.

Figure 6:
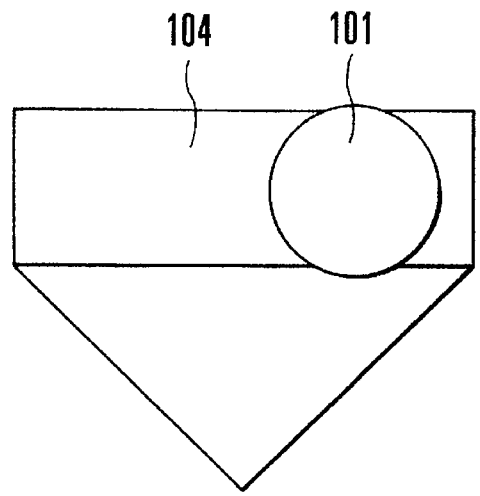
FIG. 6 is a schematic view taken in the direction of an arrow A of FIG. 5.

In the third embodiment, individual constituent elements, such as the first and second prisms 26 and 27 and the field-of-view frame 28, are set in the above-described manner so that, as shown in FIG. 9, the amount of vertical projection of the entire viewfinder system can be made small compared to the Porro prism viewfinder system shown in FIG. 6. Accordingly, the space of the viewfinder system can be effectively utilized, whereby the size of the entire viewfinder system can be reduced.

Further, in the third embodiment, the objective lens 21 is arranged to constitute the exit-side telecentric optical system, and the condition required for total reflection of a bundle of rays is satisfied even in the case of a half field of view of not less than 20 degrees. Accordingly, it is possible to facilitate observation of a viewfinder image of wide field of view.

Further, in the third embodiment, an object image obtained from the objective lens 21 is formed in the vicinity of the field-of-view frame 28 disposed in the easily sealable space between the first prism 26 and the second prism 27. Accordingly, foreign matter, such as dust, is effectively prevented from adhering to the exit surface 26d, the entrance surface 27a, or the like, and being observed together with a viewfinder image.

Further, in the third embodiment, the optical axis of the objective lens 21 and the optical axis of the eyepiece lens 25 are spaced apart from each other, thereby reducing parallax. Accordingly, it is possible to achieve an arrangement in which the eyepiece lens 25 is disposed in an end portion of the camera body.

Figure 10:
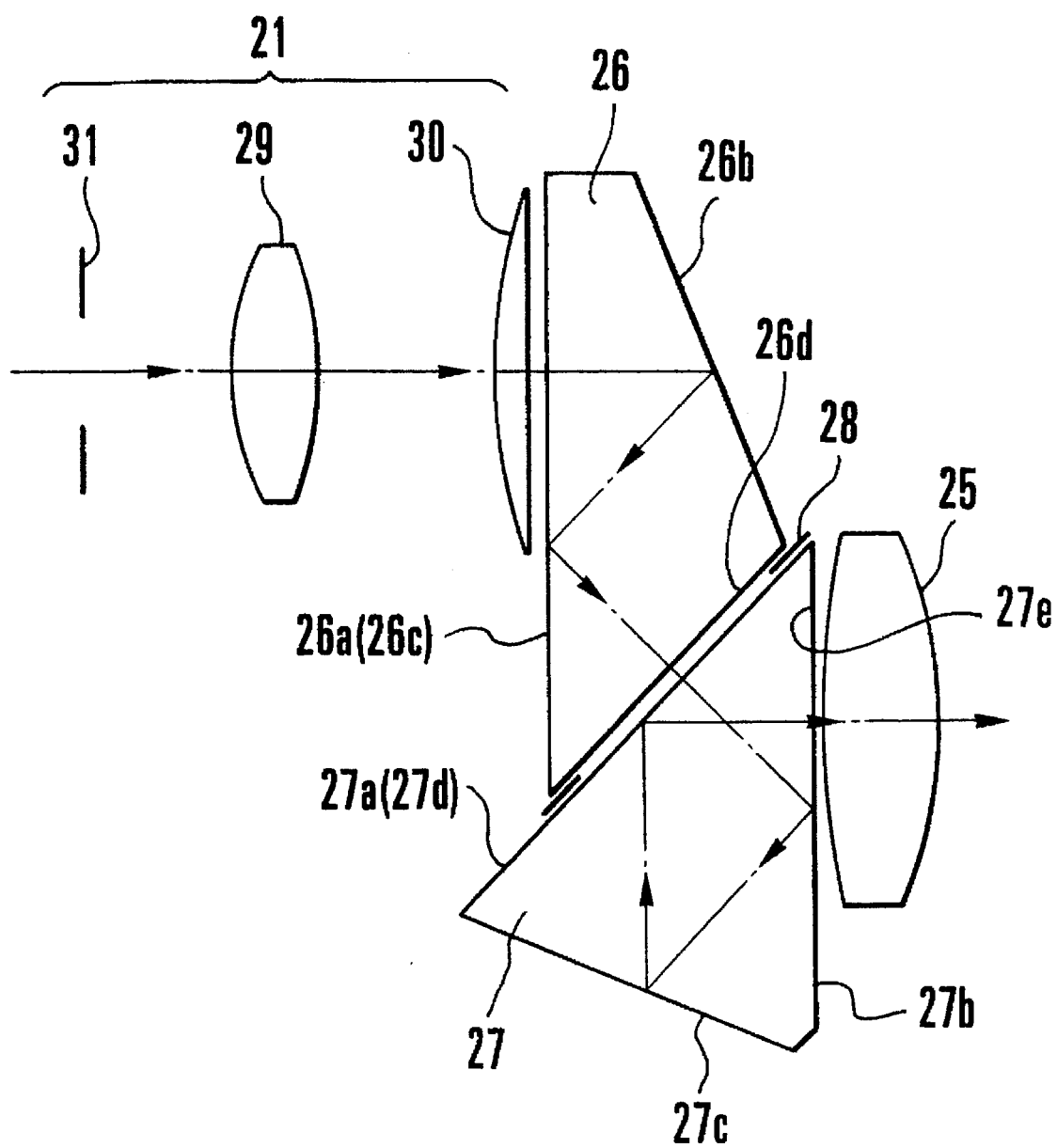
FIG. 10 is a schematic cross-sectional view of the essential portions of an optical system according to a fourth embodiment of the present invention.

FIG. 10 is a schematic cross-sectional view of the essential portions of a fourth embodiment of the present invention. In FIG. 10, the same reference numerals are used to denote constituent element substantially identical to those shown in FIG. 7.

The shown real image type viewfinder system according to the fourth embodiment is of a type which is suitable for use with a photographic lens made from a lens having a single focal length. Accordingly, the objective lens 21 does not have a zooming part and is formed by tow fixed positive lenses 29 and 30.

The shown arrangement includes a front stop 31, and the positive lens 29, the positive lens 30 and the front stop 31 are arranged to constitute an exit-side telecentric optical system. The arrangement of the other portions is substantially identical to that of the corresponding portions of the third embodiment shown in FIG. 7.

Numerical examples of the respective real image type viewfinder systems shown in FIGS. 1 and 7 are shown below. In each of the numerical examples, it is assumed that the respective optical paths of the first and second prisms are expanded.

In each of the numerical examples, "Ri" represents the radius of curvature of the i-th lens surface as viewed from an object side, "Di" represents the i-th lens thickness and air separation as viewed from the object side, and "ni" and "vi" respectively represent the refractive index and the Abbe number of the glass of the i-th lens as viewed from the object side.

If the X axis is taken in the direction of the optical axis; the H axis is taken in the direction perpendicular to the optical axis; the direction of propagation of light is positive; R represents the radius of the osculating sphere; and A, B, C, D and E represent aspheric coefficients, respectively, then the shape of the aspheric surface is represented as the following expression:

$$x = \frac{(1/R)H^2}{1 + \sqrt{1 - (H/R)^2}} + AH^2 + BH^4 + CH^6 + DH^8 + EH^{10}$$

<< Numerical Example of FIG. 1 >>

(This numerical example assumes that a camera using a 35-mm film has a zoom lens as a photographic lens and that the focal length of the zoom lens is variable between 38 mm and 76 mm.)

| \multicolumn{4}{c}{$2\omega = 27.5°$–$50°$} | | | |
|---|---|---|---|
| R1 = −15.61 | D1 = 1.29 | N1 = 1.58306 | v1 = 30.2 |
| R2 = 29.67 | D2 = variable | | |
| R3 = 11.15 | D3 = 3.09 | N2 = 1.49171 | v2 = 57.4 |
| R4 = aspheric | D4 = variable | | |
| R5 = 12.38 | D5 = 14.15 | N3 = 1.57090 | v3 = 33.8 |
| R6 = ∞ | D6 = 0.63 | | |
| R7 = ∞ | D7 = 24.00 | N4 = 1.57090 | v4 = 33.8 |
| R8 = ∞ | D8 = 0.20 | | |
| R9 = aspheric | D9 = 3.20 | N5 = 1.49171 | v5 = 57.4 |
| R10 = −13.08 | D10 = 14.00 | | |

| VARIABLE | FOCAL LENGTH | | |
|---|---|---|---|
| SEPARATION | WIDE-ANGLE | MIDDLE | TELEPHOTO |
| D2 | 8.15 | 3.96 | 1.56 |
| D4 | 2.30 | 5.62 | 8.94 |

Surface R4: aspheric

R = −10.75, A = 0, B = 4.11 × 10⁻⁴,
C = −7.40 × 10⁻⁶, D = 5.97 × 10⁻⁷
Surface R9: aspheric R = 21.82, A = 0, B = −1.41 × 10−4,
C = 1.17 × 10⁻⁶, D = −1.70 × 10⁻⁸
R5, R6: first prism
R7, R8: second prism << Numerical Example of FIG. 7 >>

(This numerical example assumes that a camera using a 35-mm film has a zoom lens as a photographic lens and that the focal length of the zoom lens is variable between 38 mm and 76 mm.)

| \multicolumn{4}{c}{$2\omega = 27.5°$–$50°$} | | | |
|---|---|---|---|
| R1 = −15.61 | D1 = 1.29 | N1 = 1.58306 | v1 = 30.2 |
| R2 = 29.67 | D2 = variable | | |
| R3 = 11.15 | D3 = 3.09 | N2 = 1.49171 | v2 = 57.4 |
| R4 = aspheric | D4 = variable | | |
| R5 = 10.66 | D5 = 1.4 | N3 = 1.49171 | v3 = 57.4 |
| R6 = ∞ | D6 = 0.1 | | |
| R7 = ∞ | D7 = 13.06 | N4 = 1.57090 | v4 = 33.8 |
| R8 = ∞ | D8 = 0.2 | | |
| R9 = ∞ | D9 = 24.0 | N5 = 1.57090 | v5 = 33.8 |
| R10 = ∞ | D10 = 0.2 | | |
| R11 = aspheric | D11 = 3.2 | N6 = 1.49171 | v6 = 57.4 |
| R12 = −13.08 | | | |

-continued

| VARIABLE | FOCAL LENGTH | | |
|---|---|---|---|
| SEPARATION | WIDE-ANGLE | MIDDLE | TELEPHOTO |
| D2 | 8.15 | 3.96 | 1.56 |
| D4 | 2.30 | 5.62 | 8.94 |

Surface R4: aspheric

R = −10.75, A = 0, B = 4.108 × 10⁻⁴,
C = −7.397 × 10⁻⁶, D = 5.97 × 10⁻⁷
Surface R11: aspheric R = 21.82, A = 0, B = −1.406 × 10⁻⁴,
C = 1.172 × 10⁻⁶, D = −1.695 × 10⁻⁸
R7, R8: first prism
R9, R10: second prism According to the above-described first to fourth embodiments, by utilizing a prism having a roof surface which is appropriately set for providing an non-inverted erecting image, it is possible to achieve a real image type viewfinder system whose entire optical system is reduced in size in the vertical and horizontal directions and which can use such a reduced-size optical system to invert a viewfinder image, which is formed as an inverted real image by an objective lens, from the inverted real image to a non-inverted erect image, thereby realizing observation of a high-quality viewfinder image.

Further, according to the above-described first to fourth embodiments, by utilizing a prism having a roof surface which is appropriately set, it is possible to achieve a real image type viewfinder system which is reduce in size in the vertical direction and in which the optical axis of an objective lens and that of an eyepiece lens can be spaced comparatively far apart from each other without increasing parallax. Accordingly, it is possible to provide a camera body having an eyepiece lens positioned in its end portion.

An embodiment for effectively eliminating stray light which does not satisfy the total-reflection condition, as stated previously in the description of the related art, will be described below.

Figure 11:
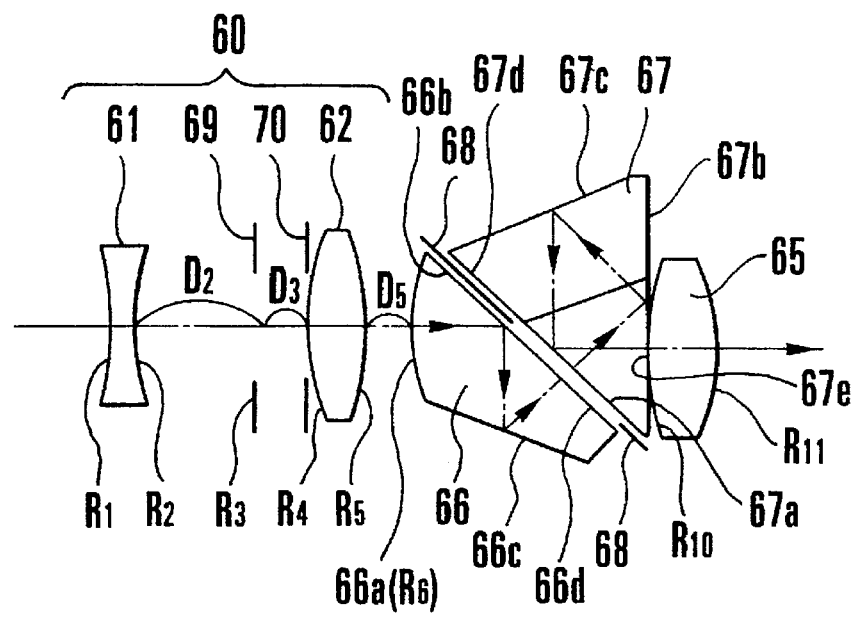
FIG. 11 is a schematic view of the essential portion of a zoom viewfinder according to a fifth embodiment of the present invention.
Figure 12A:
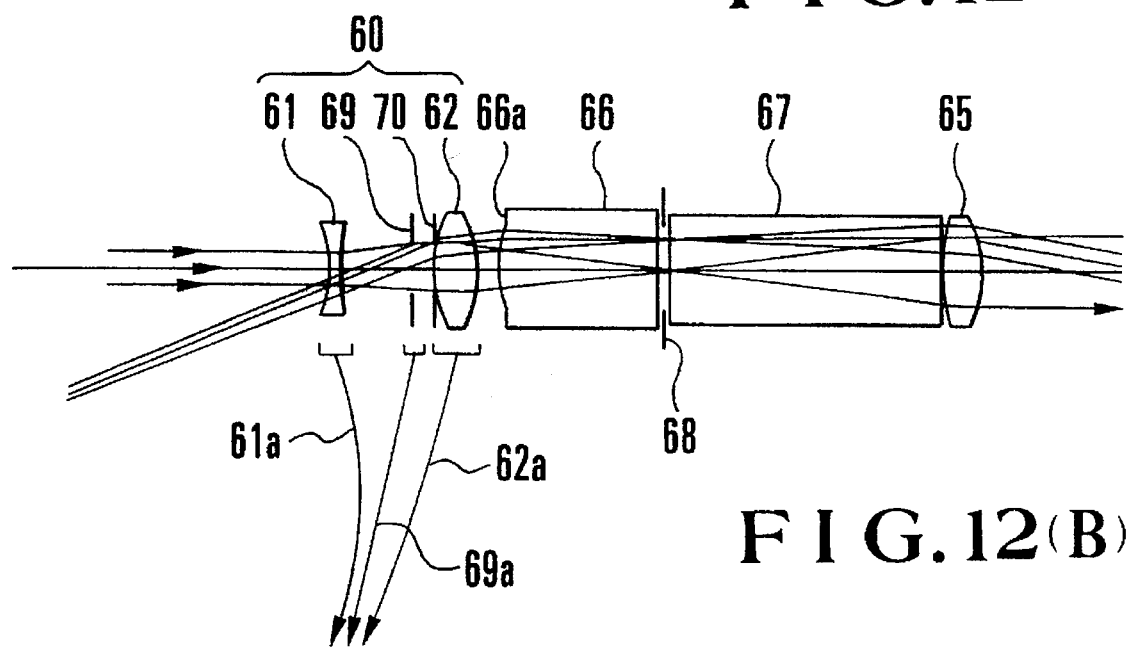
FIGS. 12(A) and 12(B) are explanatory views showing the optical path of the zoom viewfinder in expanded form.
Figure 12B:
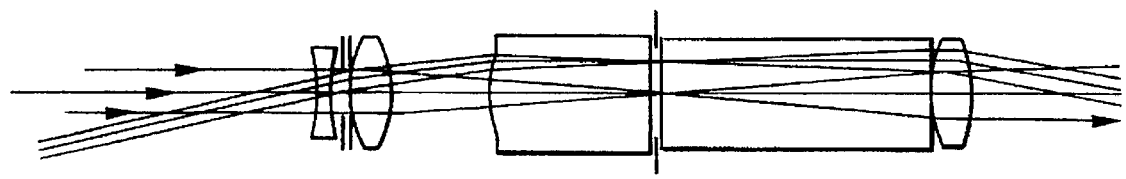

FIG. 11 is a schematic view of the essential portion of a zoom viewfinder according to a fifth embodiment of the present invention. FIGS. 12(A) and 12(B) are schematic views showing the essential portions of the optical system of the zoom viewfinder in expanded form. FIGS. 12(A) and 12(B) show the states of the optical system in the case of wide-angle-end setting and in the case of telephoto-end setting, respectively.

In the zoom viewfinder shown in FIGS. 11, 12(A) and 12(B), an objective lens 60 includes a first lens unit 61 of negative refractive power, a movable stop 69, a fixed stop 70 and a second lens unit 62 of positive refractive power.

Prisms 66 and 67 each have reflection surfaces and total-reflection surfaces as image inverting means. In FIGS. 12(A) and 12(B), the prisms 66 and 67 are shown in block form with their optical paths expanded.

The prism 66 includes an entrance surface 66a formed by a lens surface having a positive refractive power, a total-reflection surface 66b, a reflection surface 66c coated with an evaporated film, and an exit surface 66d which is on the same plane as the total-reflection surface 66b.

The prism 67 includes an entrance surface 67a, a total-reflection surface 67b, a roof reflection surface 67c, a total-reflection surface 67d which is on the same plane as the entrance surface 67a, and an exit surface 67e which is on the same plane as the total-reflection surface 67b. The exit surface 66d of the prism 66 and the entrance surface 67a of the prism 67 are parallel to each other.

A field-of-view frame 68 serves to limit the field of view of the viewfinder, and is provided in the vicinity of an image forming plane in which a viewfinder image is formed by the objective lens 60. The viewfinder image which is formed in the field-of-view frame 68 is conducted to an eyepiece lens 65 as a non-inverted erect image via a prism 67, so that the viewfinder image is observed as the non-inverted erect image through the eyepiece lens 65.

In the fifth embodiment, during zooming from the wide-angle end toward the telephoto end, the first lens unit 61 and the second lens unit 62 are made to move toward an object side as indicated by arrows 61a and 62a in such a way as to reduce the separation between the first lens unit 61 and the second lens unit 62. In the meantime, the movable stop 69 is also made to move toward the object side as indicated by an arrow 69a by an amount less than the amount of movement of the second lens unit 62 in such a way as to reduce the respective separations between the movable stop 69 and the first and second lens units 61 and 62. The fixed stop 70 moves integrally with the second lens unit 62.

In the fifth embodiment, zooming is performed by causing the first lens unit 61 and the second lens unit 62 as well as the movable stop 69 to move along the optical axis of the objective lens 60 in the above-described manner. Accordingly, it is possible to form a viewfinder image as a real image with various magnifications in the vicinity of the field-of-view frame 68 via the prism 66.

In the fifth embodiment, the objective lens 60 and the entrance surface 66a of the prism 66 are arranged to constitute an approximately telecentric optical system, so that a principal ray of light of the bundle which passes through the entrance surface 66a of the prism 66 becomes approximately parallel to the optical axis of the objective lens 60. The viewfinder image which is formed in the field-of-view frame 68 is conducted to the eyepiece lens 65 as a non-inverted erect image via the prism 67, so that the viewfinder image is observed as the non-inverted erecting image through the eyepiece lens 65.

Figure 14A:
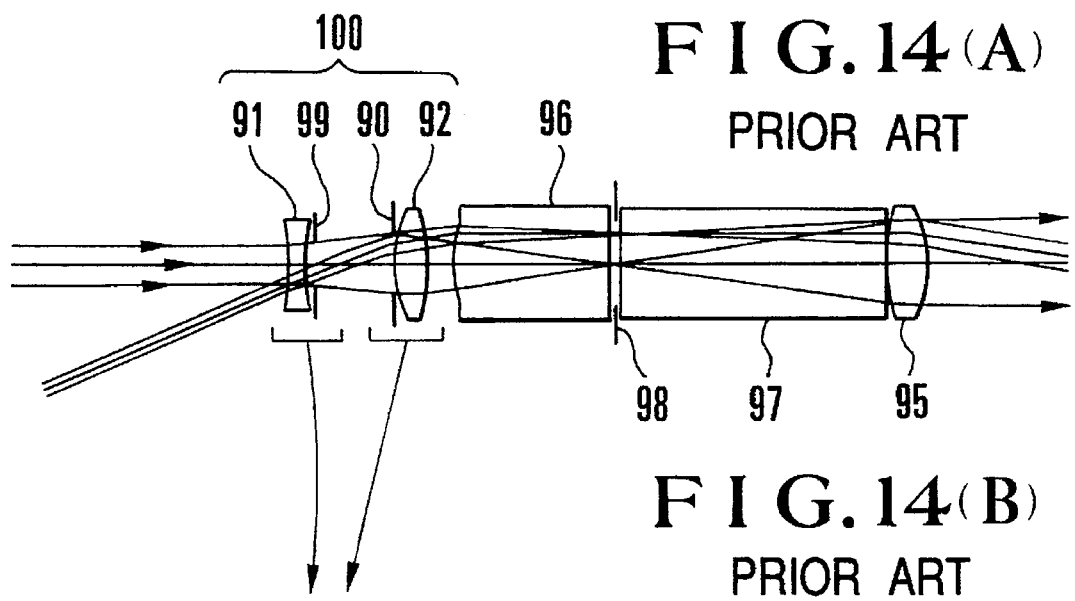
FIGS. 14(A) and 14(B) are schematic views showing the essential portions of a conventional zoom viewfinder in the state of expanding its optical path.
Figure 14B:
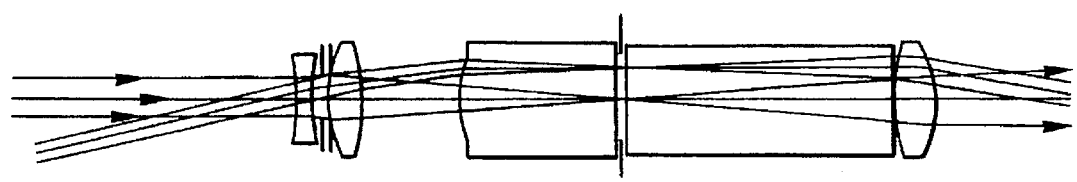

In general, the on-axial bundle of rays of the zoom viewfinder according to the fifth embodiment has a great bundle width in the case of the wide-angle end setting. For this reason, in the fifth embodiment, in the case of the wide-angle end setting, the movable stop 69 is moved in the direction of the second lens unit 62 so that only a peripheral portion of the on-axial bundle of rays is blocked without blocking an off-axial bundle of rays, as compared to the related art zoom viewfinder shown in FIGS. 14(A) and 14(B).

In this manner, the bundle width of the on-axial bundle of rays is reduced, so that the bundle of rays can be totally reflected in such a way that a major part of the on-axial bundle of rays satisfies the total-reflection condition on the total-reflection surfaces (66b, 67b and 67d) which are provided in the prisms 66 and 67. Accordingly, it is possible to effectively prevent occurrence of stray light.

According to the arrangement of the fifth embodiment, the bundle of rays for a total field of view which has been made incident on the entrance surface 66a of the prism 66 is totally reflected by the total-reflection surface 66b, then reflected by the reflection surface 66c, and then exits through the exit surface 66d. At this time, the principal ray of light for the total field of view exits approximately perpendicularly to the exit surface 66d. The bundle of rays which has exited through the exit surface 66d is made incident on the entrance surface 67a of the prism 67, then totally reflected by the total-reflection surface 67b, and then reflected by the roof reflection surface 67c. The reflected bundle of rays is totally reflected by the total-reflection surface 67d and exits through the exit surface 67e. At this time, the principal ray of light for the total field of view exits approximately perpendicularly to the exit surface 67e.

According to the above-described arrangement, it is possible to effectively achieve the total reflection of the bundle of rays for a total field of view on each of the total-reflection surfaces.

Figure 13:
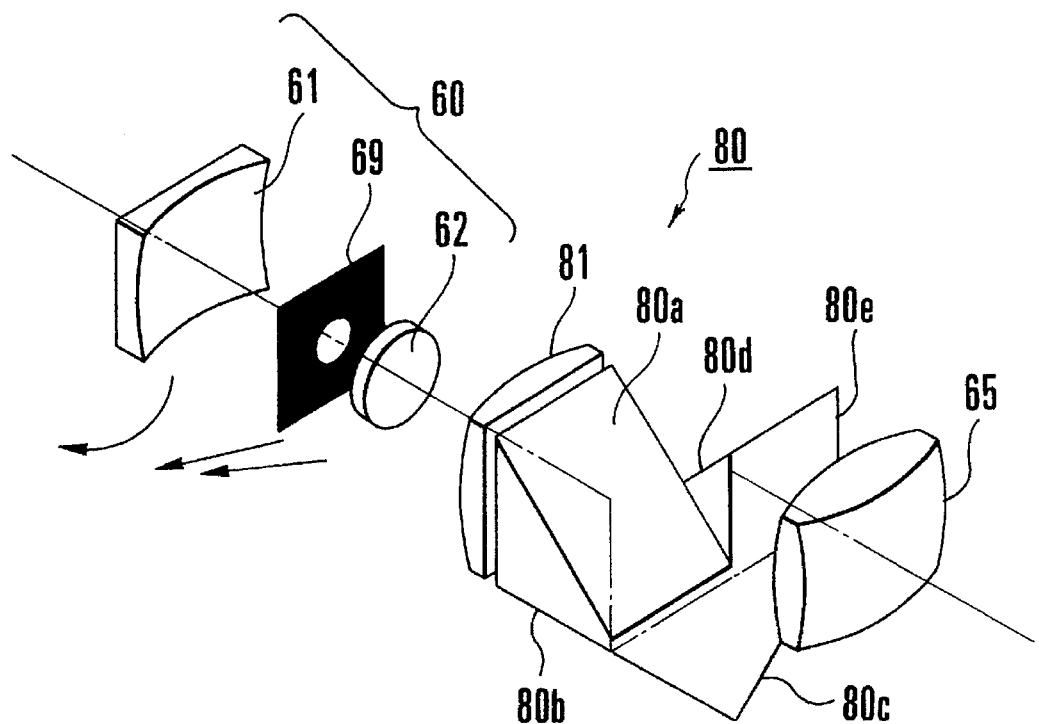
FIG. 13 is a schematic perspective view of the essential portions of a zoom viewfinder according to a sixth embodiment of the present invention.

FIG. 13 is a schematic perspective view of the essential portions of a zoom viewfinder according to a sixth embodiment of the present invention.

The sixth embodiment differs from the embodiment shown in FIG. 11 only in that a Porro prism 80 is employed as image inverting means and a field lens 81 is provided in the vicinity of an image forming plane in which a viewfinder image is formed by the objective lens 60. Regarding the arrangement of the other portions, both embodiments are substantially identical to each other. In FIG. 13, the same reference numerals are used to denote constituent elements identical to those shown in FIG. 11.

In the sixth embodiment, a viewfinder image is formed in the vicinity of the field lens 81 or in an image forming plane located in the vicinity of the entrance surface of the Porro prism 80 by the objective lens 60. The viewfinder image formed in the image forming plane is reflected (totally reflected) by reflection surfaces 80a, 80b, 80c and 80d of the Porro prism 80 in that order, whereby the viewfinder image is inverted from its inverted real image to a non-inverted erect image. After that, the viewfinder image is made to exit through an exit surface 80e and subjected to observation through the eyepiece lens 65.

In the sixth embodiment, the movable stop 69 is made to move in accordance with the zooming of the photographic lens (not shown) in a manner similar to that described previously in connection with the fifth embodiment shown in FIG. 11. Accordingly, in the sixth embodiment as well, it is possible to achieve effects and advantages similar to those of the fifth embodiment.

A numerical example of the zoom viewfinder shown in FIG. 11 is shown below. In the numerical example, "Ri" represents the radius of curvature of the i-th lens surface as viewed from an object side, "Di" represents the i-th lens thickness and air separation as viewed from the object side, and "ni" and "vi" respectively represent the refractive index and the Abbe number of the glass of the i-th lens as viewed from the object side.

If the X axis is taken in the direction of the optical axis; the H axis is taken in the direction perpendicular to the optical axis; the direction of propagation of light is positive; R represents the radius of the osculating sphere; and A, B, C, D and E represent aspheric coefficients, respectively, then the shape of the aspheric surface is represented as the following expression:

$$x = \frac{(1/R)H^2}{1 + \sqrt{1 - (H/R)^2}} + AH^2 + BH^4 + CH^6 + DH^8 + EH^{10}$$

<< Numerical Example of FIG. 11 >>

| 2ω = 27.5°–50° | | | |
|---|---|---|---|
| R1 = −15.61 | D1 = 1.29 | N1 = 1.58306 | v1 = 30.2 |
| R2 = 29.67 | D2 = variable | | |
| R3 = ∞ | D3 = variable | | |
| R4 = 11.15 | D4 = 3.09 | N2 = 1.49171 | v2 = 57.4 |
| R5 = aspheric | D5 = variable | | |

-continued

| R6 = 12.38 | D6 = 14.15 | N3 = 1.57090 | ν3 = 33.8 |
| R7 = ∞ | D7 = 0.63 | | |
| R8 = ∞ | D8 = 24.20 | N4 = 1.57090 | ν4 = 33.8 |
| R9 = ∞ | D9 = 0.20 | | |
| R10 = aspheric | D10 = 3.20 | N5 = 1.49171 | ν5 = 57.4 |
| R11 = −13.08 | D11 = 14.00 | | |

R7: exit surface of prism 66
R8, R9: entrance surface and exit surface of prism 67

| VARIABLE SEPARATION | FOCAL LENGTH | | |
| --- | --- | --- | --- |
| | WIDE-ANGLE | MIDDLE | TELEPHOTO |
| D2 | 6.00 | 2.50 | 0.86 |
| D3 | 2.15 | 1.46 | 0.70 |
| D7 | 2.30 | 5.62 | 8.94 |

Aspheric

R5: R = −10.76, A = 0, B = 4.1 × 10$^{-4}$,
C = −7.4 × 10$^{-6}$, D = 5.97 × 10$^{-7}$
R10: R = 21.82, A = 0, B = −1.41 × 10$^{-4}$,
C = 1.17 × 10$^{-6}$, D = −1.7 × 10$^{-8}$

It is to be noted that, in a viewfinder system according to the present invention, it is preferable to satisfy the following condition:

$$1.3 < D_w/f_w < 10$$

where $f_w$ is the focal length of the objective lens in a wide-angle end, and $D_w$ is the total length of the objective lens in the wide-angle end. In this case, the total length is the distance between a first surface of the objective optical system and a primary image forming plane. In a case such as that shown in FIG. 4, the total length represents the distance from the stop 10.

It is more preferable to satisfy the following condition:

$$1.5 < D_w/f_w < 8$$

Incidentally, if the objective optical system has a single focal length, this focal length is set to $f_w$.

Also, it is preferable to satisfy the following condition:

$$0.2 < f_w/f_e < 2$$

where $f_w$ is the focal length of the objective lens in a wide-angle end, and $f_e$ is the focal length of the eyepiece lens.

The values of the respective numerical examples of FIGS. 1 and 7 are listed below.

| | $f_w$ | $D_w$ | $D_w/f_w$ | $f_e$ | $f_w/f_e$ |
| --- | --- | --- | --- | --- | --- |
| NUMERICAL EXAMPLE OF FIG. 1 | 7.32 | 29.48 | 4.027 | 17.15 | 0.427 |
| NUMERICAL EXAMPLE OF FIG. 7 | 7.32 | 29.59 | 4.042 | 17.15 | 0.427 |

The primary image forming plane in the numerical example of FIG. 1 corresponds to a position of "0.5" from a sixth surface (6d), and the primary image forming plane in the numerical example of FIG. 7 corresponds to a position of "0.2" from an eighth surface (26d).

According to the above-described fifth and sixth embodiments, by appropriately setting the lens arrangement of the objective lens, it is possible to achieve a zoom viewfinder whose entire lens system is reduced in size and which can easily perform zooming. Further, in the zoom viewfinder, it is possible to effectively eliminate stray light which passes through the total-reflection surfaces of a prism used as image inverting means and enters an eyepiece lens without satisfying the total-reflection condition, so that a high-quality viewfinder image can be observed with various viewfinder magnifications.

What is claimed is:

1. A viewfinder device arranged to relay an optical path of an objective lens, comprising:
   a first prism unit; and
   a second prism unit;
      said first prism unit including:
         a surface 1-1 for entrance of light from the objective lens into said first prism unit;
         a reflecting surface 1-2 for totally reflecting the light entering from said surface 1-1; and
         a reflecting surface 1-3 for reflecting the light reflected by said surface 1-2;
      said second prism unit including:
         a surface 2-1 for entrance of the light reflected by said surface 1-3 into said second prism unit;
         a reflecting surface 2-2 for reflecting the light entering from said surface 2-1; and
         a reflecting surface 2-3 for reflecting the light reflected by said surface 2-2;
      said surface 2-1 reflecting the light reflected by said surface 2-3; and
      the objective lens forming an image between said first prism unit and said second prism unit, and the objective lens having a substantially telecentric characteristic,
   whereby the following condition is satisfied:

$$0.2 < f_w/f_e < 2$$

where $f_w$ is the focal length of the objective lens in a wide-angle end, and $f_e$ is the focal length of an eyepiece lens.

2. A viewfinder device according to claim 1, wherein said surface 1-1 is a lens surface having a positive refractive power.

3. A viewfinder device according to claim 1, wherein said surface 2-3 is of a roof type.

4. A viewfinder device according to claim 1, wherein said surface 1-2 also permits the light reflected by said surface 1-3 to exit from the first prism unit.

5. A viewfinder device according to claim 1, wherein the objective lens is a zoom lens.

6. A viewfinder device according to claim 1, wherein each of said surface 1-2 and said surface 2-2 totally reflects the light.

7. A viewfinder device according to claim 1, wherein said surface 1-2 and said surface 2-1 are in parallel with each other.

8. A viewfinder device according to claim 1, further comprising a field-of-view frame disposed between said first prism unit and said second prism unit.

9. A viewfinder device according to claim 3, wherein said surface 2-3 is folded along shorter sides of a field of view.

10. A viewfinder device according to claim 1, satisfying the following condition:

$$1.3 < D_w/f_w < 10$$

where $f_w$ is the focal length of the objective lens in a wide-angle end, and $D_w$ is the total length of the objective lens in the wide-angle end.

11. A zoom viewfinder comprising:
    an objective lens;

an optical unit for converting a viewfinder image formed by said objective lens into a non-inverted erect image; and an eyepiece lens unit;

said objective lens including;
a first lens unit of negative refractive power;
a movable stop for blocking a peripheral portion of an on-axial bundle of light rays forming the image; and
a second lens unit of positive refractive power
said first lens unit, said movable stop and said second lens unit being arranged in that order from an object side;
said first lens unit, said movable stop and said second lens unit being movable toward the object side while reducing their respective separations, thereby effecting zooming from a wide-angle end toward a telephoto end.

12. A zoom viewfinder according to claim 13, wherein said optical unit has at least one total-reflection surface.

13. A viewfinder device arranged to relay an optical path of an objective lens, comprising:

a first prism unit; and
a second prism unit;
said first prism unit including:
a surface 1-1 having a positive power for entrance of light from the objective lens into said first prism unit;
a surface 1-2 for totally reflecting the light entering from said surface 1-1; and
a surface 1-3 for reflecting the light reflected by said surface 1-2;
said second prism unit including:
a surface 2-1 for entrance of the light reflected by said surface 1-3;
a surface 2-2 for reflecting the light entering from said surface 2-1; and
a surface 2-3 for reflecting the light reflected by said surface 2-2;
said surface 2-1 reflecting the light reflected by said surface 2-3; and
the objective lens forming an image between said first prism unit and said second prism unit,
whereby the following condition is satisfied:

$$0.2 < f_w/f_e < 2$$

where $f_w$ is the focal length of the objective lens in a wide-angle end, and $f_e$ is the focal length of an eyepiece lens.

14. A viewfinder device according to claim 13, wherein said surface 2-3 is of a roof type.

15. A viewfinder device according to claim 13, wherein the objective lens has a substantially telecentric characteristic.

16. A viewfinder device according to claim 13, wherein said surface 1-2 also permits the light reflected by said surface 1-3 to exit from the first prism unit.

17. A viewfinder device according to claim 13, wherein the objective lens is a zoom lens.

18. A viewfinder device according to claim 13, wherein each of said surface 1-2 and said surface 2-2 totally reflects the light.

19. A viewfinder device according to claim 13, further comprising a field-of-view frame disposed between said first prism unit and said second prism unit.

20. A viewfinder device according to claim 14, wherein said surface 2-3 is folded along the shorter sides of a field of view.

21. A viewfinder device according to claim 13, satisfying the following condition:

$$1.3 < D_w/f_w < 10$$

where $f_w$ is the focal length of the objective lens in a wide-angle end, and $D_w$ is the total length of the objective lens in the wide-angle end.

22. A viewfinder device arranged to relay an optical path of an objective lens, comprising:

a first prism unit; and
a second prism unit;
said first prism unit including:
a surface 1-1 for entrance of light from the objective lens into said first prism unit;
a surface 1-2 for totally reflecting the light entering from said surface 1-1; and
a surface 1-3 for reflecting the light reflected by said surface 1-2;
said second prism unit including:
a surface 2-1 for entrance of the light reflected by said surface 1-3;
a surface 2-2 for reflecting the light entering from said surface 2-1; and
a roof type surface 2-3 for reflecting the light reflected by said surface 2-2;
said surface 2-1 reflecting the light reflected by said surface 2-3; and
the objective lens forming an image between said first prism unit and said second prism unit, and said roof type surface 2-3 reflecting the light in the direction of a short side of the view field,
whereby the following condition is satisfied:

$$0.2 < f_w/f_e < 2$$

where $f_w$ is the focal length of the objective lens in a wide-angle end, and $f_e$ is the focal length of an eyepiece lens.

23. A viewfinder device according to claim 22, wherein said surface 1-1 is a lens surface having a positive refractive power.

24. A viewfinder device according to claim 22, wherein the objective lens has a substantially telecentric characteristic.

25. A viewfinder device according to claim 22, wherein said surface 1-2 also permits the light reflected by said surface 1-3 to exit from the first prism unit.

26. A viewfinder device according to claim 22, wherein the objective lens is a zoom lens.

27. A viewfinder device according to claim 22, wherein each of said surface 1-2 and said surface 2-2 totally reflects the light.

28. A viewfinder device according to claim 22, further comprising a field-of-view frame disposed between said first prism unit and said second prism unit.

29. A viewfinder device according to claim 22, satisfying the following condition:

$$1.3 < D_w/f_w < 10$$

where $f_w$ is the focal length of the objective lens in a wide-angle end, and $D_w$ is the total length of the objective lens in the wide-angle end.

30. A viewfinder device arranged to relay an optical path of an objective lens, comprising:

a first prism unit; and
a second prism unit;
said first prism unit including:

a surface 1-1 for entrance of light from the objective lens into said first prism unit;

a reflecting surface 1-2 for reflecting the light entering from said surface 1-1; and a reflecting surface 1-3 for totally reflecting the light reflected by said surface 1-2;

said second prism untíl including:

a surface 2-1 for entrance of the light reflected by said surface 1-3 into said second prism unit;

a reflecting surface 2-2 for reflecting the light entering from said surface 2-1; and a reflecting surface 2-3 for reflecting the light reflected by said surface 2-2;

said surface 2-1 reflecting the light reflected by said surface 2-3; and the objective lens forming an image between said first prism unit and said second prism unit, and the objective lens having a substantially telecentric characteristic, whereby the following condition is satisfied:

$$0.2 < f_w/f_e < 2$$

where $f_w$ is the focal length of the objective lens in a wide-angle end, and $f_e$ is the focal length of an eyepiece lens.

* * * * *

UNITED STATES PATENT AND TRADEMARK OFFICE
CERTIFICATE OF CORRECTION

PATENT NO. : 5,640,632
DATED : June 17, 1997
INVENTOR(S) : TAKESHI KOYAMA, ET AL.

It is certified that error appears in the above-identified patent and that said Letters Patent is hereby corrected as shown below:

Column 1

Line 16, "erecting" should read --erect--.
    Line 31, "erecting" should read --erect--.
    Line 39, "erected" should read --erect--.
    Line 61, "erecting" should read --erect--.

Column 6

Line 10, "erecting" should read --erect--.
    Line 41, "element" should read --elements--.

Column 8

Line 39, "element" should read --elements--.

Column 9

Line 41, "x 10-4" should read --x $10^{-4}$--.

UNITED STATES PATENT AND TRADEMARK OFFICE
CERTIFICATE OF CORRECTION

PATENT NO. : 5,640,632

DATED : June 17, 1997

INVENTOR(S) : TAKESHI KOYAMA, ET AL.

It is certified that error appears in the above-identified patent and that said Letters Patent is hereby corrected as shown below:

Column 10

Line 21, "erecting" should read --erect--.
    Line 31, "reduce" should read --reduced--.

Column 15

Line 20, "has" should read --comprises--.

Column 17

Line 7, "until" should read --unit--.

Signed and Sealed this

Sixth Day of January, 1998

Attest:

BRUCE LEHMAN

Attesting Officer     Commissioner of Patents and Trademarks